US007954718B2

(12) United States Patent
Tseng

(10) Patent No.: US 7,954,718 B2
(45) Date of Patent: Jun. 7, 2011

(54) METHOD OF INTEGRATING BARCODE INFORMATION AND EXTENDED DISPLAY IDENTIFICATION DATA

(75) Inventor: Shih-Hua Tseng, Taipei (TW)

(73) Assignee: Tatung Company, Taipei (TW)

( * ) Notice: Subject to any disclaimer, the term of this patent is extended or adjusted under 35 U.S.C. 154(b) by 811 days.

(21) Appl. No.: 12/003,537

(22) Filed: Dec. 28, 2007

(65) Prior Publication Data

US 2008/0302865 A1 Dec. 11, 2008

(30) Foreign Application Priority Data

Jun. 8, 2007 (TW) ................................ 96120890 A

(51) Int. Cl.
*G06K 7/10* (2006.01)

(52) U.S. Cl. .............................. 235/462.01; 235/462.07

(58) Field of Classification Search ............. 235/462.01, 235/436, 462.07, 454
See application file for complete search history.

(56) References Cited

U.S. PATENT DOCUMENTS

2002/0191108 A1* 12/2002 Ko ................................ 348/569
2006/0195833 A1* 8/2006 Lo ................................. 717/168

* cited by examiner

*Primary Examiner* — Daniel St.Cyr
(74) *Attorney, Agent, or Firm* — Bacon & Thomas, PLLC

(57) ABSTRACT

A method of integrating barcode information and EDID firstly inputs barcode information and temporarily stores the information in a first storage device; reads a pre-stored barcode rule and a pre-stored check code from a second storage device, wherein the barcode rule is defined with relevant data of plural codes included in the barcode information; then, respectively stores the plural codes included in the barcode information into corresponding storage spaces of the first storage device according to the barcode rule; next, determines whether a specific code of the barcode information matches with the check code; if the specific code of the barcode information matches with the check code, reads a pre-stored EDID from an EDID burning device, and integrates the EDID with the plural codes of the barcode information so as to generate a new EDID; finally, performs a burning operation to a display device based on the new EDID.

21 Claims, 5 Drawing Sheets

TWT726A200102

FIG. 3

METHOD OF INTEGRATING BARCODE INFORMATION AND EXTENDED DISPLAY IDENTIFICATION DATA

BACKGROUND OF THE INVENTION

1. Field of the Invention

The present invention relates to a data integration method, and more particularly, to a method of integrating barcode information and extended display identification data 2. Description of Related Art With the popularity of computer technology, the plug and play function becomes an essential function of computer peripheral equipment. As to a display device, the video electronics standard association (VESA) is responsible for promoting and developing important display device and display device interface standards, so as to make sure its commonality. Extended display identification data (EDID) standard is one of the standard data formats established by VESA. EDID includes basic data of a display device, such as: manufacturer information, maximum image size, color feature, usage frequency limitation, and etc. The EDID is stored in a display device and used for communicating with a computer host, thereby achieving the plug and play function.

In the past decades, as shown in FIG. 1, display device manufacturers always store EDID corresponding to a plurality of different type displays of device respectively into storage medium such as a floppy 111, a hard drive 112 or a portable drive 113, and connect to a PC frame 100 formed by a computer 110 as a main frame for an EDID burning operation, so as to connect to a VGA video connection interface 131, a DVI video connection interface 132 or a HDMI video connection interface 133 of a to-be-burned display device 130 through an interface converting device 120, thereby writing the EDID into a non-erasable memory of the display device 130.

However, with regard to an A-47 display device 130, different batches of A-47 display devices have different dates and serial numbers on the barcode information because they have different manufacturing dates. When performing a burning operation to A batch of A-47 display devices, a manufacturing factory operator has to read EDID corresponding to the A batch from the floppy 111 via the computer 110, and then writes the EDID into the display device via the VGA video connection interface 131. When performing a burning operation to B batch of A-47 display devices, the manufacturing factory operator has to read EDID corresponding to the B batch from the floppy 111 via the computer 110, and then writes the EDID into the display device via the VGA video connection interface 131.

However, in the past, operations of reading, burning and editing the EDID were all executed on the basis of a huge-volume PC frame, which not only caused problems in the aspects of equipment cost and maintenance expenses, but also caused the problem of unable to immediately update the EDID in the storage medium, even resulting in a serious management problem such as the difficulty of controlling data flows. Meanwhile, for display devices with different types or display devices with different batches, the manufacturing factory operators have to prepare different barcode information and EDIDs, which not only increases the complexity of operations, but also is difficult to prevent the EDID from being inappropriately burned into the display device.

Therefore, it is desirable to provide a method of integrating barcode information and extended display identification data to mitigate and/or obviate the aforementioned problems.

SUMMARY OF THE INVENTION

In order to solve the abovementioned problems, the present invention provides a method of integrating barcode information and extended display identification data (EDID), applied in an EDID burning device for integrating barcode information and an EDID. The EDID burning device comprises a first storage device and a second storage device. The first storage device has a plurality of designated storage spaces for storing corresponding codes. The method comprises: (A) inputting the barcode information, and temporarily storing the barcode information in the first storage device of the EDID burning device; (B) reading a pre-stored barcode rule and a pre-stored check code from the second storage device, the barcode rule defined with relevant data of a plurality of codes included in the barcode information; (C) respectively storing the plurality of codes included in the barcode information into corresponding storage spaces of the first storage device according to the barcode rule; (D) determining whether a specific code of the barcode information matches with the check code; (E) if the specific code of the barcode information matches with the check code, reading a pre-stored EDID from the EDID burning device, and integrating the EDID with the plurality of codes of the barcode information so as to generate a new EDID; and (F) performing a burning operation to a display device based on the new EDID.

BRIEF DESCRIPTION OF THE DRAWINGS

FIG. 3 illustrates a schematic drawing of barcode information according to the present invention.

DETAILED DESCRIPTION OF THE PREFERRED EMBODIMENT

Below please find specific embodiments to explain the implementation of the present invention, such that a person skilled in the art could easily understand the advantage and effect of the present invention according to the disclosure of this specification.

Figure 1:
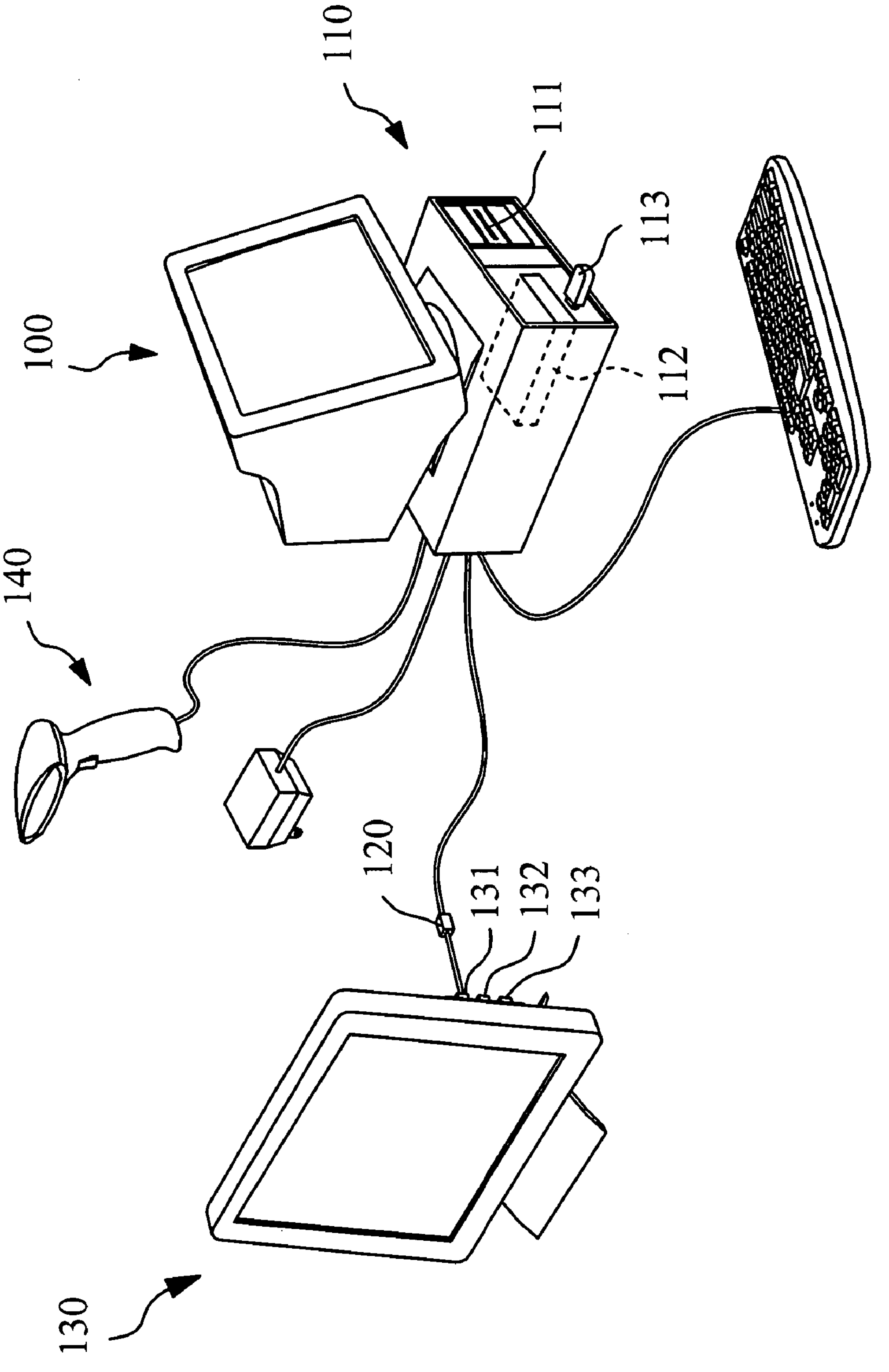
FIG. 1 (Prior Art)
FIG. 1 illustrates a schematic drawing of a conventional EDID burning system.
Figure 2:
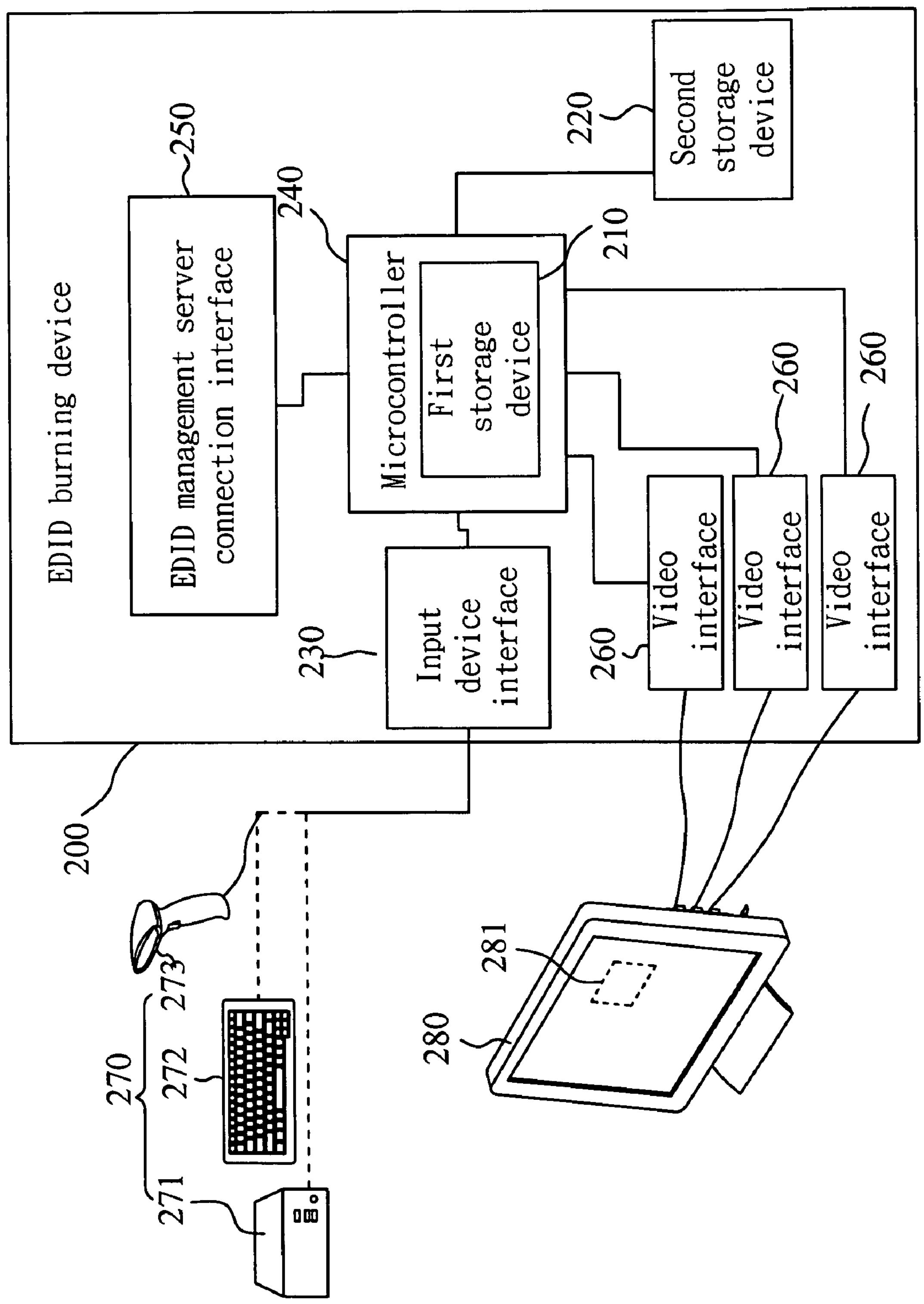
FIG. 2 illustrates a system schematic drawing of one preferred embodiment according to the present invention.

FIG. 2 illustrates a system schematic drawing of an EDID burning device 200 according to the present invention. As shown in FIG. 2, the EDID burning device 200 of the present invention comprises a first storage device 210, a second storage device 220, an input device interface 230, a microcontroller 240, an EDID management server connection interface 250 and a plurality of video interfaces 260.

The EDID burning device 200 is connected to an input device 270 via the input device interface 230, so as to perform a burning operation to a to-be-burned display device 280, wherein the to-be-burned display device 280 must have independent barcode information 281 on it. FIG. 3 illustrates a schematic drawing of the barcode information 281 according to the present invention. After the input device 270 scans the barcode information, the burning operation would start.

Figure 4:
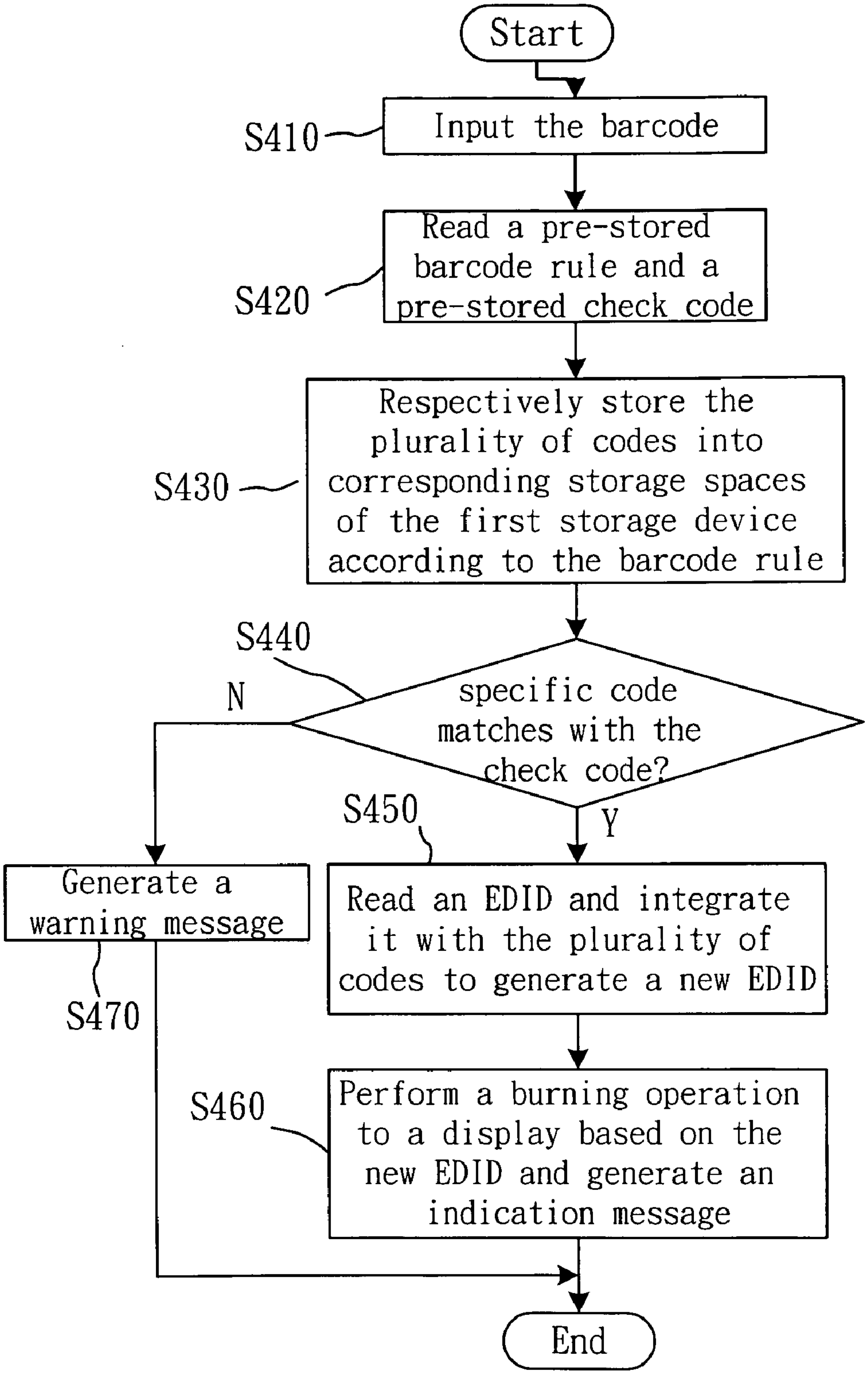
FIG. 4 illustrates a flowchart of a method of integrating barcode information and extended display identification data according to the present invention.
Figure 5:
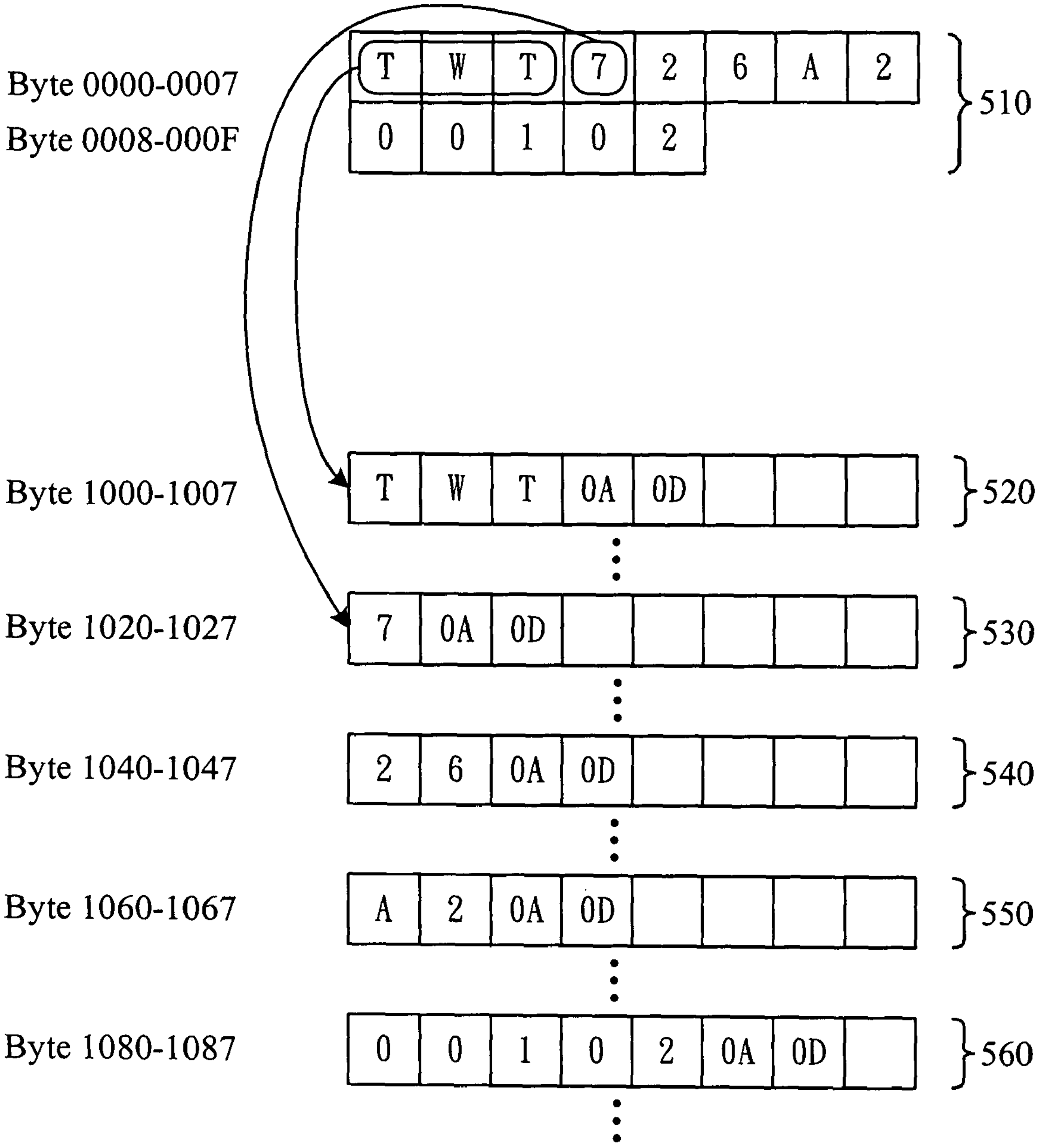
FIG. 5 illustrates a schematic drawing of memory content of a first storage device according to the present invention.

FIG. 4 illustrates a flowchart of a method of integrating barcode information and extended display identification data according to the present invention, and FIG. 5 illustrates a schematic drawing of memory content of a first storage device according to the present invention. The EDID burning device 200 is used to integrate the barcode information 281 and an EDID. The first storage device 210 is a random access memory (RAM). The second storage device 220 is a read-only memory (ROM). The first storage device 210 has a plurality of designated storage spaces for storing corresponding codes.

First, step S410 utilizes the input device 270 to input the barcode information, and stores the barcode information into the first storage device 210 of the EDID burning device, wherein the first storage device has a designated storage space 510 for storing the inputted barcode information.

The barcode information is composed of the following codes: a title code as t, a head code as h, a serial number code as s, a fix serial number as f, a date code as d, a week code as w, a month code as m, a year code as y, a Gamma code as g and a Null code as x.

The title code t is preferably at most 7 bytes. The storage space in the first storage device 210 for storing the title code is larger than 7 bytes. The title code could set its bit number and store content of the title code into a designated storage space 520 according to the barcode rule. The head code h is preferably at most 5 bytes. The storage space in the first storage device 210 for storing the head code is larger than 5 bytes. The head code could set its bit number and store content of the head code into a designated storage space 550 according to the barcode rule. For prevent contrived oversight reason, wherein defined these two codes could be respectively used for authenticating whether matching with the check code. Or, the head code could be selectively integrated with the title code for respectively authenticating whether matching with the check code.

The serial number code s is preferably at most 20 bytes. The storage space in the first storage device 210 for storing the serial number code is larger than 20 bytes. The serial number code could set its bit number and store content of the serial number code into a designated storage space 560 according to the barcode rule. The fix serial number code f is preferably at most 1 byte. The storage space in the first storage device 210 for storing the fix serial number code is larger than 1 byte. The fix serial number code could set its bit number and store content of the fix serial number code into a designated storage space (not shown in figures) according to the barcode rule. These two codes are respectively used for representing a manufacturing serial number of a product. Or, the fix serial number code could be combined with the serial number code for representing the manufacturing serial number of the product.

The date code d is preferably at most 2 bytes. The storage space in the first storage device 210 for storing the date code is larger than 2 bytes. The date code could set its bit number and store content of the date code into a designated storage space (not shown in figures) according to the barcode rule. The week code w is preferably at most 2 bytes. The storage space in the first storage device 210 for storing the week code is larger than 2 bytes. The week code could set its bit number and store content of the week code into a designated storage space 540 according to the barcode rule. The month code m is preferably at most 1 byte. The storage space in the first storage device 210 for storing the month code is larger than 1 byte. The month code could set its bit number and store content of the month code into a designated storage space (not shown in figures) according to the barcode rule. The year code y is preferably at most 2 bytes. The storage space in the first storage device 210 for storing the year code is larger than 2 bytes. The year code could set its bit number and store content of the year code into a designated storage space 530 according to the barcode rule. These four codes are used for representing a manufacturing time of a product.

The Gamma code g is preferably at most 1 byte. The storage space in the first storage device 210 for storing the Gamma code is larger than 1 byte. The Gamma code could set its bit number and store content of the Gamma code into a designated storage space (not shown in figures) according to the barcode rule. The Null code x is not limited to the bit number, and the system would directly ignore it without performing any process. These two codes are used for processing a specific situation.

In this embodiment, the inputted barcode information is TWT726A200102, which is stored in a designated storage space 510 of the first storage device 210. FIG. 5 illustrates the schematic drawing of the memory content of the first storage device 210.

Step S420 reads a pre-stored barcode rule and a pre-stored check code from the second storage device 220. The barcode rule is defined with relevant data of the plurality of codes included in the barcode information. The barcode rule is defined with types, bit numbers and addresses of codes included in the barcode information. In this embodiment, the pre-stored barcode rule is tttywwhhsssss, and the pre-stored check code is TWT and A2.

Step S430 respectively stores the plurality of codes included in the barcode information into corresponding storage spaces of the first storage device 210 according to the barcode rule. As shown in FIG. 5, the first storage device 210 has storage spaces 510~560 corresponding to the plurality of codes included in the barcode information.

Because the barcode rule is tttywwhhsssss, wherein ttt represents that the first to third bytes included in the barcode information are the title code, the first to third bytes in the first storage space 510 of the first storage device 210 would be copied to a designated storage space 520 of the first storage device 210 corresponding to the title code, and then $0A_H$ and $0D_H$ would be filled in after data TWT as end of data.

Because the barcode rule is ttttwhhsssss, wherein y represents that the fourth byte included in the barcode information is the year code, the fourth byte in the first storage space 510 of the first storage device 210 would be copied to a designated storage space 530 of the first storage device 210 corresponding to the year code, and then $0A_H$ and $0D_H$ would be filled in after data 7 as end of data.

Because the barcode rule is tttywwhhsssss, wherein ww represents that the fifth to sixth bytes included in the barcode information are the week code, the fifth to sixth bytes in the first storage space 510 of the first storage space 210 would be copied to a designated storage space 540 of the first storage device 210 corresponding to the week code, and then $0A_H$ and $0D_H$ would be filled in after data 26 as end of data.

Because the barcode rule is tttywwhhsssss, wherein hh represents that the seventh to eighth bytes included in the barcode information are the head code, the seventh to eights bytes in the first storage space 510 of the first storage device 210 would be copied to a designated storage space 550 of the first storage device 210 corresponding to the head code, and then $0A_H$ and $0D_H$ would be filled in after data A2 as end of data.

Because the barcode rule is tttywwhhsssss, wherein sssss represents that the ninth to thirteenth bytes included in the barcode information are the serial number code, the ninth to thirteenth bytes in the first storage space 510 of the first storage device 210 would be copied to a designated storage space 560 of the first storage device 210 corresponding to the serial number code, and then $0A_H$ and $0D_H$ would be filled in after data 00102 as end of data.

Other codes also follow the above rules.

Step S440 determines whether a specific code of the barcode information matches with the check code. In this embodiment, the specific code includes the title code and the head code. That is, the present invention respectively compares the title code and the head code of the barcode information with the pre-stored check code. Because the title code of the barcode information is TWT and the head code of the barcode information is A2, and the pre-stored check code includes TWT and A2, the specific code of the barcode information matches with the check code.

When determining the specific code of the barcode information matches with the check code, step S450 reads a pre-stored EDID (not shown in figures) from the EDID burning device 200, and integrates the EDID with the plurality of codes of the barcode information, so as to generate a new EDID.

Step S460 performs a burning operation to a display device based on the new EDID, and generates an indication message after completing the burning operation.

If step S440 determines that the specific code of the barcode information does not match with the check code, step S470 would generate a warning message.

According to the above description, the method of integrating barcode information and extended display identification data of the present invention could integrate barcode information on a display device and burn it into the display device. When facing display devices with different types or display devices with different batches, the manufacturing factory operators do not have to prepare multiple EDIDs. Therefore, the present invention could not only reduce the complexity of operations, but also prevent the EDID from being inappropriately burned into the display device.

Although the present invention has been explained in relation to its preferred embodiment, it is to be understood that many other possible modifications and variations can be made without departing from the spirit and scope of the invention as hereinafter claimed.

What is claimed is:

1. A method of integrating barcode information and extended display identification data (EDID), for integrating barcode information and an EDID on an EDID burning device, the EDID burning device comprising a first storage device and a second storage device, the first storage device having a plurality storage spaces for storing corresponding codes, the method comprising:

(A) inputting the barcode information, and temporarily storing the barcode information in the first storage device of the EDID burning device;

(B) reading a pre-stored barcode rule and a pre-stored check code from the second storage device, the barcode rule defined with relevant data of a plurality of codes included in the barcode information;

(C) respectively storing the plurality of codes included in the barcode information into corresponding storage spaces of the first storage device according to the barcode rule;

(D) determining whether a specific code of the barcode information matches with the check code;

(E) if the specific code of the barcode information matches with the check code, reading a pre-stored EDID from the EDID burning device, and integrating the EDID with the plurality of codes of the barcode information so as to generate a new EDID; and (F) performing a burning operation to a display device based on the new EDID.

2. The method as claimed in claim 1, further comprising the following step:

(G) generating an indication message after completing the burning operation.

3. The method as claimed in claim 1, wherein if step (D) determines the specific code of the barcode information does not match with the check code, generates a warning message.

4. The method as claimed in claim 3, wherein in step (D), the specific code is a title code or a head code.

5. The method as claimed in claim 1, wherein in step (B), the barcode rule is defined with types, bit numbers and addresses of codes included in the barcode information.

6. The method as claimed in claim 5, wherein the barcode information includes a title code for authenticating whether matching with the check code, and the title code could set its bit number and store content of the title code into a designated storage space according to the barcode rule.

7. The method as claimed in claim 5, wherein the barcode information includes a head code for authenticating whether matching with the check code, and the head code could set its bit number and store content of the head code into a designated storage space according to the barcode rule.

8. The method as claimed in claim 6, wherein the barcode information includes a head code for authenticating whether matching with the check code, and the head code could be selectively integrated with the title code for respectively authenticating whether matching with the check code; and the head code could set its bit number and store content of the head code into a designated storage space according to the barcode rule.

9. The method as claimed in claim 5, wherein the barcode information includes a serial number code for representing a manufacturing serial number of a product, and the serial number code could set its bit number and store content of the serial number code into a designated storage space according to the barcode rule.

10. The method as claimed in claim 9, wherein the barcode information includes a fix serial number code, the fix serial number code is combined with the serial number code for representing the manufacturing serial number of the product, and the fix serial number code could set its bit number and store content of the fix serial number code into a designated storage space according to the barcode rule.

11. The method as claimed in claim 5, wherein the barcode information includes a fix serial number code for representing a manufacturing serial number of a product, and the fix serial number code could set its bit number and store content of the fix serial number code into a designated storage space according to the barcode rule.

12. The method as claimed in claim 5, wherein the barcode information includes a date code for representing a manufacturing date of a product, and the date code could set its bit number and store content of the date code into a designated storage space according to the barcode rule.

13. The method as claimed in claim 5, wherein the barcode information includes a week code for representing a manufacturing week of a product, and the week code could set its bit number and store content of the week code into a designated storage space according to the barcode rule.

14. The method as claimed in claim 5, wherein the barcode information includes a month code for representing a manufacturing month of a product, and the month code could set its bit number and store content of the month code into a designated storage space according to the barcode rule.

15. The method as claimed in claim 5, wherein the barcode information includes a year code for representing a manufacturing year of a product, and the year code could set its bit number and store content of the year code into a designated storage space according to the barcode rule.

16. The method as claimed in claim 5, wherein the barcode information includes a Gamma code for processing a specific situation, and the Gamma code could set its bit number and store content of the Gamma code into a designated storage space according to the barcode rule.

17. The method as claimed in claim 5, wherein the barcode information includes a Null code, the Null code is not limited to the bit number, for representing to directly ignore it without performing any process.

18. The method as claimed in claim 5, wherein after the first storage device completes storing the codes, $0A_H$, $0D_H$ or a null character would be filled in as end of data.

19. The method as claimed in claim 1, wherein the first storage device is a random access memory.

20. The method as claimed in claim 1, wherein the second storage device is a read-only memory.

21. The method as claimed in claim 1, wherein the EDID burning device is connected to an input device for inputting the barcode information.

* * * * *